US006886860B2

(12) United States Patent
Singleton et al.

(10) Patent No.: US 6,886,860 B2
(45) Date of Patent: May 3, 2005

(54) ADAPTER FOR MOUNTING ITEMS ON A STEERING COLUMN

(75) Inventors: William A. Singleton, Grafton, OH (US); Scott R. Weslow, Ravenna, OH (US); Mark H. Sciulli, Lorain, OH (US)

(73) Assignee: Bendix Commercial Vehicle Systems, LLC, Elyria, OH (US)

( * ) Notice: Subject to any disclaimer, the term of this patent is extended or adjusted under 35 U.S.C. 154(b) by 54 days.

(21) Appl. No.: 10/217,548

(22) Filed: Aug. 13, 2002

(65) Prior Publication Data

US 2004/0031633 A1 Feb. 19, 2004

(51) Int. Cl.⁷ .............................................. B62D 1/16
(52) U.S. Cl. ...................................................... 280/779
(58) Field of Search ............................... 280/779, 777, 280/775; 74/492, 493; 180/90

(56) References Cited

U.S. PATENT DOCUMENTS 6,481,786 B1 * 11/2002 Kim ...................... 296/203.02
6,501,033 B2 * 12/2002 Pastwa et al. ........... 200/61.27
6,575,497 B1 * 6/2003 McCarthy et al. .......... 280/777
6,592,148 B2 * 7/2003 Byers et al. ................. 280/777

FOREIGN PATENT DOCUMENTS

| DE | 27 19 728 A1 | 11/1977 |
| EP | 1 069 026 A3 | 1/2001 |
| EP | 1 069 026 A2 | 1/2001 |

* cited by examiner

Primary Examiner—Faye M. Fleming
(74) Attorney, Agent, or Firm—Calfee, Halter & Griswold LLP

(57) ABSTRACT

A steering column assembly that includes a steering column, and a bracket for mounting the steering column to the dashboard of a vehicle; and an adapter detachably connected to the steering column for providing an interface for mounting a plurality of items on the adapter. The bracket further includes a tongue and the adapter further includes a notch for engaging the tongue such that the adapter can be mounted on the steering column in only one orientation. The adapter component of the present invention further includes a plurality of surfaces for mounting various items on the adapter. The adapter may be easily modified to accommodate different system devices or other items.

14 Claims, 8 Drawing Sheets

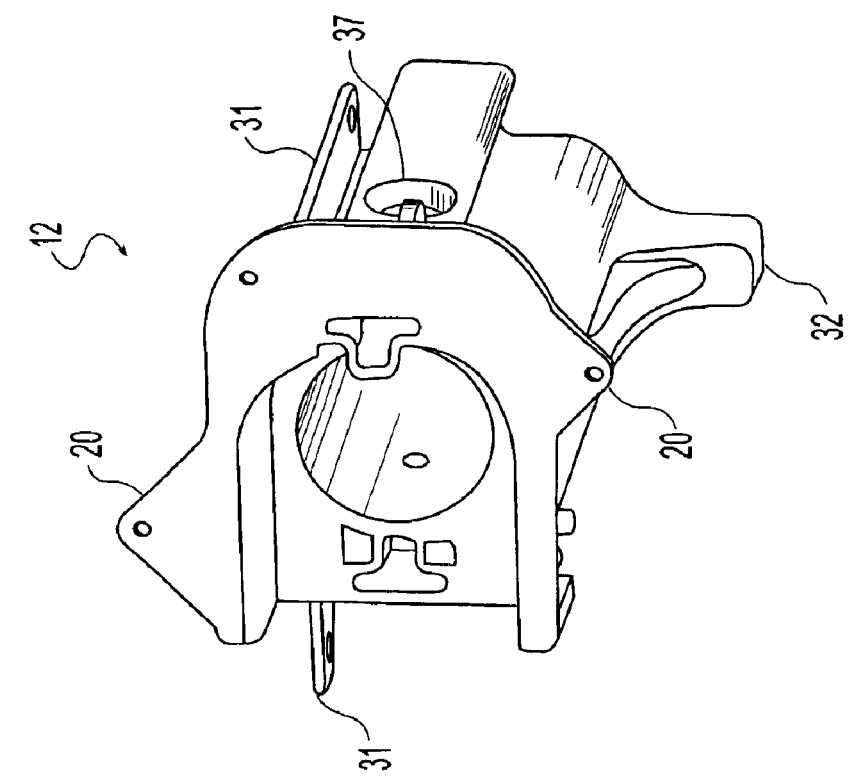
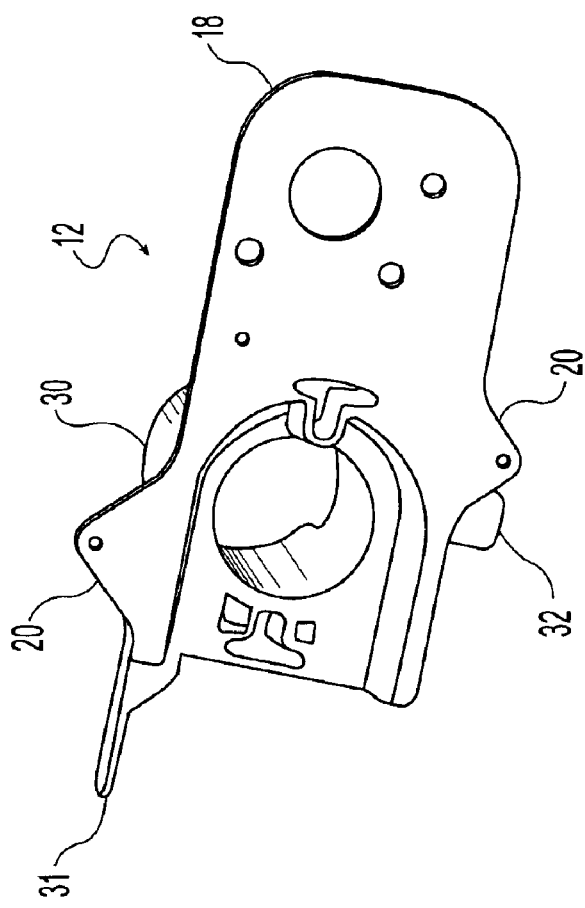
Fig. 5A
Fig. 5B

ADAPTER FOR MOUNTING ITEMS ON A STEERING COLUMN

FIELD OF THE INVENTION

The present invention relates generally to a device for mounting items on the steering columns of vehicles and specifically to a modifiable adapter useful for mounting a variety of items including certain system devices and column covers on the steering columns of industrial vehicles.

BACKGROUND OF THE INVENTION

Modern industrial vehicles such as diesel trucks and the like are complex and sophisticated machines that include a multitude of systems and subsystems that control the function and behavior of the vehicle. While certain systems and subsystems function autonomously when the vehicle is running, certain other systems must be subject to the control of the vehicle's operator. For example, the operator of a truck must be able to quickly and easily control the turn signals, the lights, and the hand brake valve, in addition to being able to accurately and safely steer the truck.

For some time, manufacturers of trucks and other vehicles have mounted the controls for certain vehicle subsystems, such as the exterior lights, on the steering column where such controls are easily accessible to the operator of the vehicle. Because each of the controls mounted on the steering column is most often designed and manufactured independently of the other controls, each control typically has unique physical characteristics and structure. To accommodate the various geometries of the control devices, steering columns are typically manufactured with a prefabricated interface upon which the control devices are mounted. While effective at providing the necessary mounting surface, the adapter or interface adds considerable structural complexity to the steering column itself. Such complex structures are expensive to design and manufacture and cannot easily be modified to allow certain control devices to be replaced or exchanged for different devices.

Furthermore, if the owner or operator of a vehicle wishes to change the steering column itself from a tilting steering column to a fixed, non-tilting steering column, for example, relocating the various control devices to the new steering column will be very difficult unless the new column has been manufactured to include an adapter compatible with the original configuration and characteristics of the control devices. Engineering or reengineering a steering column to have a specific or unique set of characteristics is impractical and expensive, especially when the final configuration of required control devices may not be known until assembly of the truck is nearly complete. If changes must be made late in the assembly process, a steering column with the wrong set of device mounting surfaces may be unusable. Thus, there is a need for an adapter that (i) provides a common interface for a variety of devices, (ii) can easily be removed from one steering column and placed onto another steering column without changing the physical structure of the column; and (iii) can be modified for use with a variety of system devices or other items where each device or item has different physical characteristics.

SUMMARY THE INVENTION

A preferred embodiment of the present invention provides a steering column assembly that further includes a (i) steering column, and a bracket for mounting the steering column to the dashboard of a vehicle; and (ii) an adapter detachably connected to the steering column for providing an interface for mounting a plurality of items on the adapter. The bracket further includes a tongue and the adapter further includes a notch for engaging the tongue such that the adapter can be mounted on the steering column in only one orientation.

The adapter component of the present invention further includes a plurality of surfaces for mounting various items on the adapter. This plurality of surfaces further includes a multifunction switch mounting surface, a hand brake valve mounting surface, a clockspring mounting surface, and column cover mounting surface. Items that may be mounted on the adapter include a multifunction switch, a hand brake valve, a clockspring, a bottom column cover, and a top column cover. The adapter may be easily modified to accommodate different system devices or other items and may be fabricated from polymer, plastic, glass reinforced nylon, glass reinforced acetyl, aluminum, an aluminum alloy, or any other material that provides sufficient rigidity and durability.

Further advantages of the present invention will become apparent to those of ordinary skill in the art upon reading and understanding the following detailed description of the preferred embodiments.

BRIEF DESCRIPTION OF THE DRAWINGS

FIG. 5A is a front view of a preferred embodiment of the adapter component of the present invention.

FIG. 5B is a perspective view of an embodiment of the adapter wherein the hand brake valve mounting surface has been eliminated from the adapter.

DETAILED DESCRIPTION OF THE INVENTION

Figure 1:
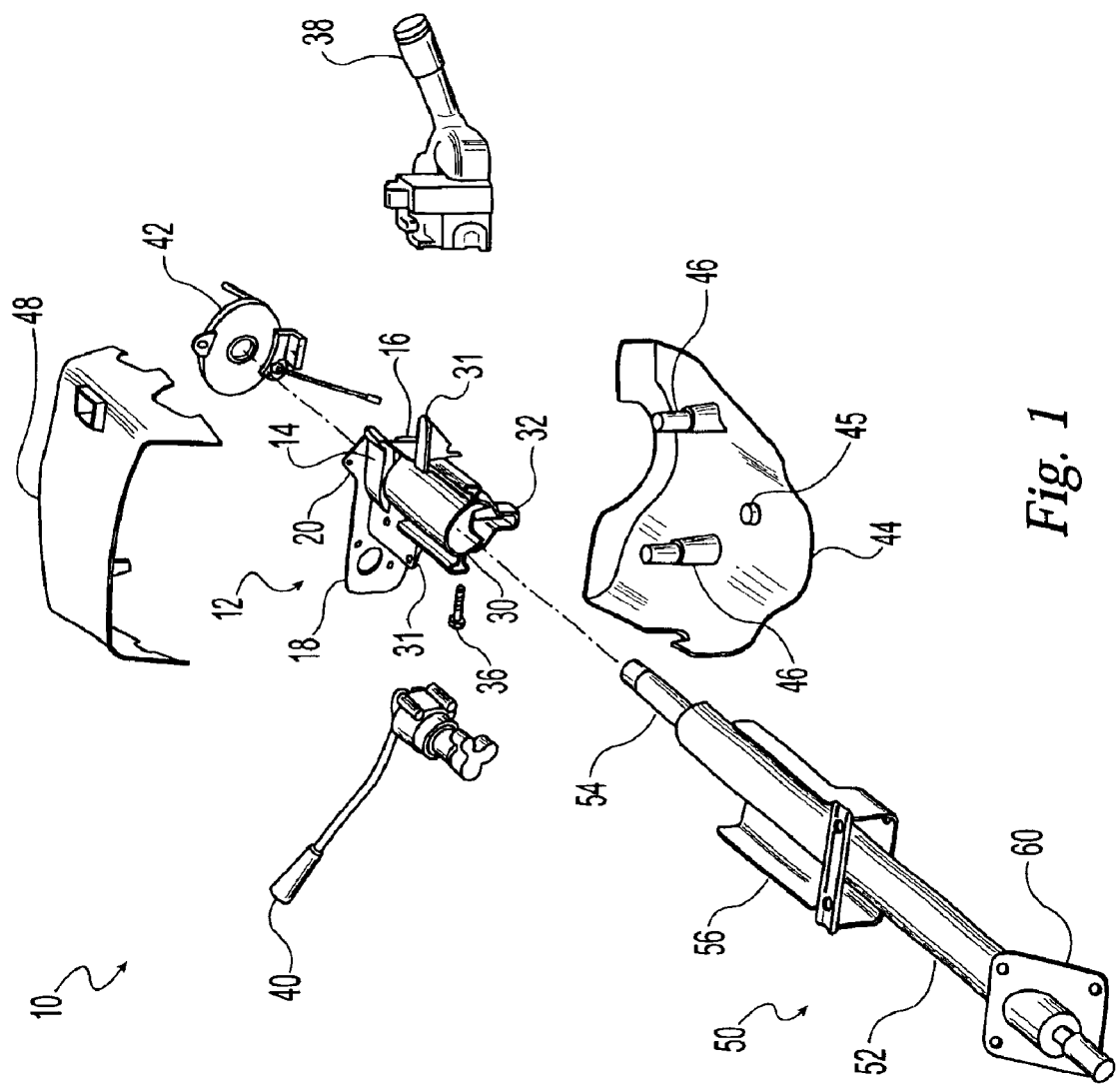
FIG. 1 is an exploded perspective view of the steering column assembly of the present invention showing (i) the adapter, (ii) the steering column to which the adapter attaches, and (iii) a plurality of system devices positioned near the various mounting surfaces.

| Reference Numerals | |
|---|---|
| 10 | steering column assembly |
| 12 | adapter |
| 14 | device interface |
| 16 | multifunction switch mounting surface |
| 18 | hand brake valve mounting surface |
| 20 | clockspring mounting surface |
| 30 | steering column interface |
| 31 | lateral column cover mounting surfaces |
| 32 | bottom column cover mounting surface |
| 34 | notch |
| 36 | mounting bolt |
| 37 | cavity |
| 38 | mutifunction switch |
| 40 | hand control valve |
| 42 | clockspring |
| 44 | bottom cover |
| 45 | recess |
| 46 | socket |
| 48 | top cover |
| 50 | steering column sub-assembly |
| 52 | steering column support tube |
| 54 | steering column shaft |
| 56 | bracket |
| 58 | tongue |
| 60 | plate |

In broad terms, this invention provides a steering column assembly that includes certain modular or interchangeable components. This steering column assembly may be installed in a variety of industrial or commercial vehicles including diesel trucks, busses, vans, and the like. A preferred embodiment of the present invention provides a steering column assembly that includes a steering column and an adapter, specifically keyed to the steering column, that accommodates and supports a variety of system device. While the present invention, in the broadest sense, is intended for use on a variety of steering columns, the exemplary embodiment of this invention is directed toward an adapter that mounts on a steering column, or steering column sub-assembly, that includes a number of additional structural elements as discussed below.

With reference to FIG. 1, and according to a preferred embodiment of the present invention, steering column assembly 10 includes adapter 12, a variety of items such as system devices and components that are attachable to adapter 12, and steering column sub-assembly 50. Adapter 12, which mounts on the steering column, further comprises device interface 14 and steering column interface 30. Device interface 14 further comprises a plurality of mounting surfaces that are specifically designed to accommodate particular system devices. System devices that are compatible with the present invention include, but are not limited to, hand brake valves, turn signal devices, and clocksprings. Various alternate embodiments of this invention are configured to accommodate different combinations of system devices.

Figure 2A:
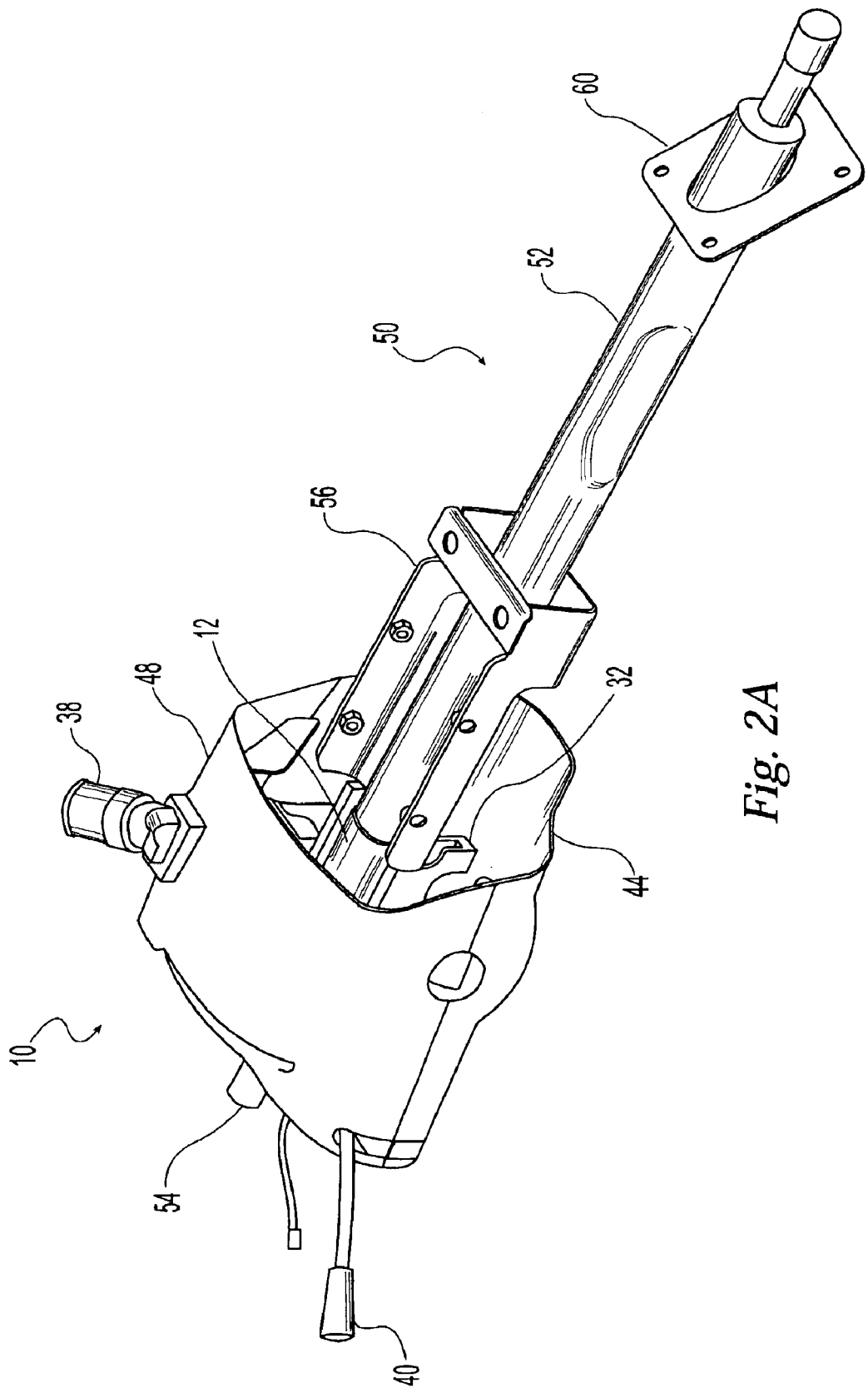
FIG. 2A is a perspective view of the adapter and steering column of FIG. 1 showing the adapter, system components, and column covers mounted on the steering column.
Figure 2B:
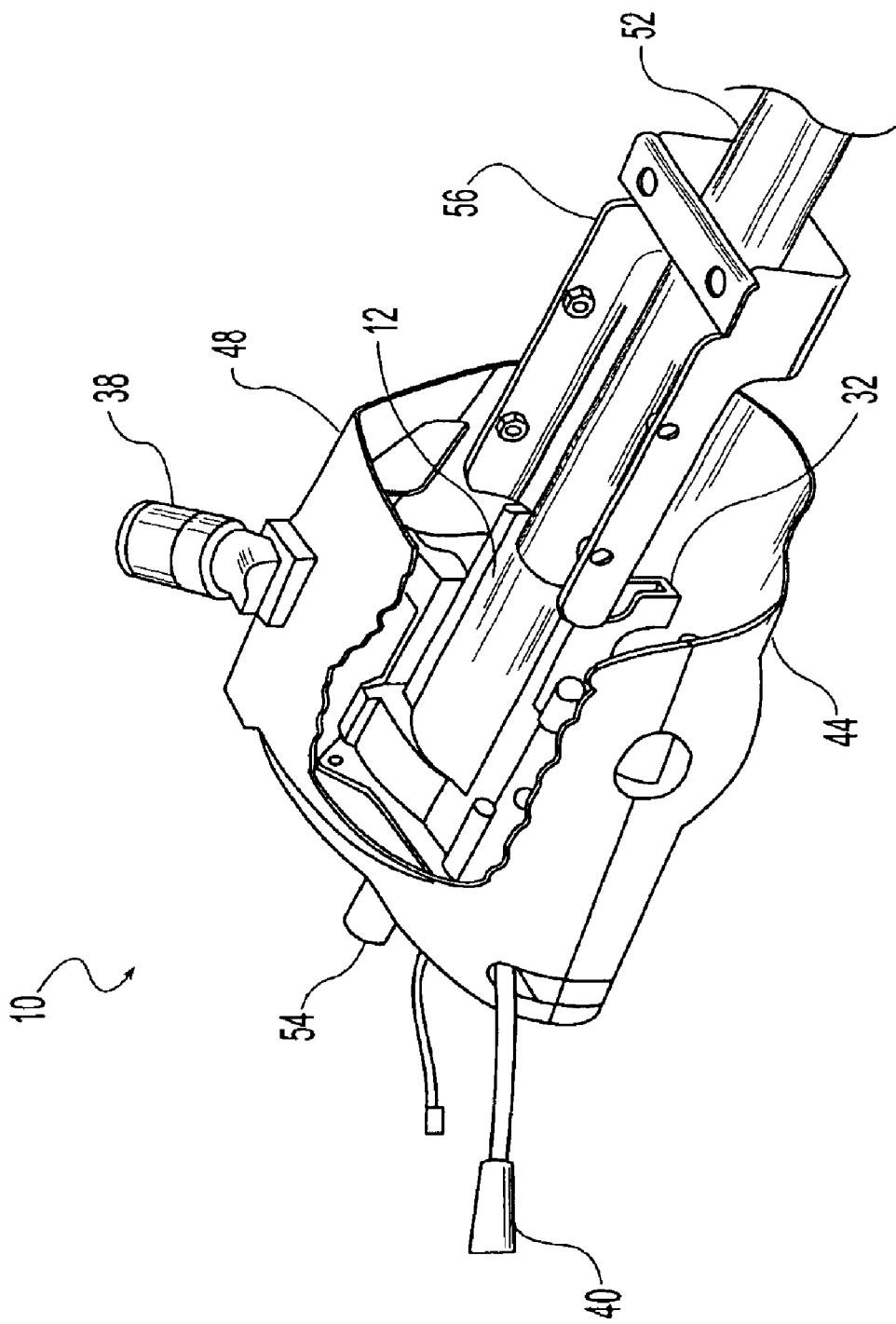
FIG. 2B is a cutaway perspective view of the adapter and steering column of FIG. 1 showing the adapter, system components, and column covers mounted on the steering column.

As shown in FIG. 1, adapter 12 comprises a device interface 14 and a steering column interface 30. Device interface 14 provides a plurality of mounting surfaces designed to accommodate different system devices and other items such as covers for the steering column. Each mounting surface is different than the other mounting surfaces and is designed to correspond to the physical characteristics of a particular system device. For example, in FIG. 1 the system devices shown include (i) multifunction switch 38 which allows the vehicle's operator to control subsystems such the turn signals, headlights, flash-to-pass lights, and windshield washers; (ii) hand brake valve 40 for the vehicle's braking system; and (iii) clockspring 42. Multifunction switch 38 attaches to multi function switch mounting surface 16, hand control valve 40 attaches to hand brake valve mounting surface 18, and clockspring 42 attaches to clockspring mounting surface 20. FIGS. 2A and 2B show the system devices attached to adapter 12.

As also shown in FIG. 1, adapter 12 includes bottom column cover mounting surface 32. Bottom cover 44 is attached to bottom column cover mounting surface 32, preferably by means of a single mounting screw or bolt inserted into recess 45 and passing through an aperture in bottom column cover mounting surface 32. Adapter 12 also includes lateral column cover mounting surfaces 31 opposite one another on either side of adapter 12. Each lateral column cover mounting surface includes an aperture passing completely though its surface. Once bottom cover 44 is in place, top cover 48 is attached to bottom cover 44 preferably by inserting a screw or bolt into each socket 46. Once inserted in the sockets, these screws or bolts pass through the apertures in the lateral column cover mounting surfaces and into a receiving area on the underside of top cover 48. FIGS. 2A and 2B show the entire steering column assembly 10 with adapter 12 mounted on the steering column and the system devices and column covers mounted on adapter 12.

Figure 3:
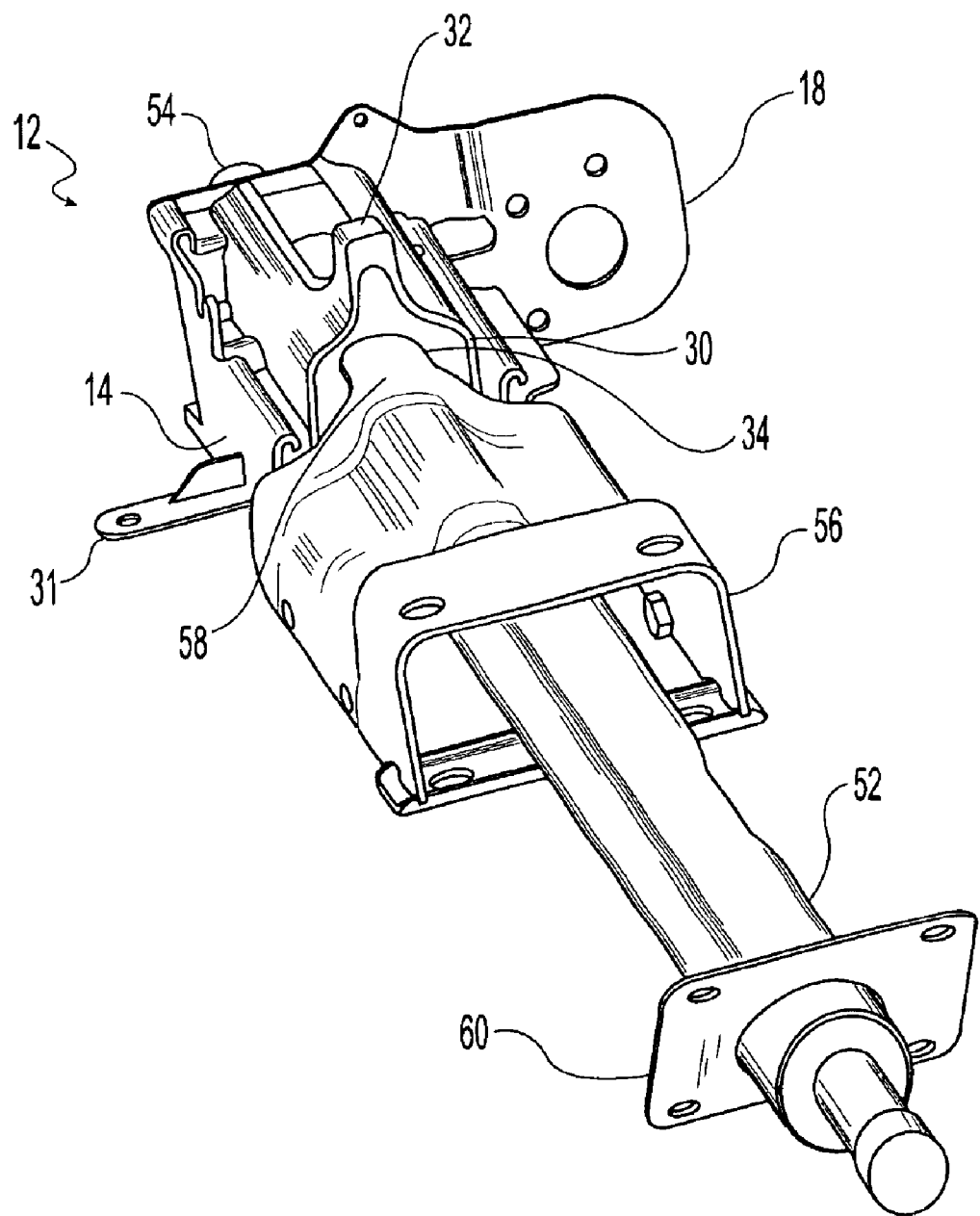
FIG. 3 is a bottom perspective view of the adapter component of the present invention mounted on a steering column wherein the bracket that supports the steering column includes a tongue that fits into a notch on the adapter and provides a means for ensuring that the adapter is mounted on the steering column in the proper orientation.
Figure 4:
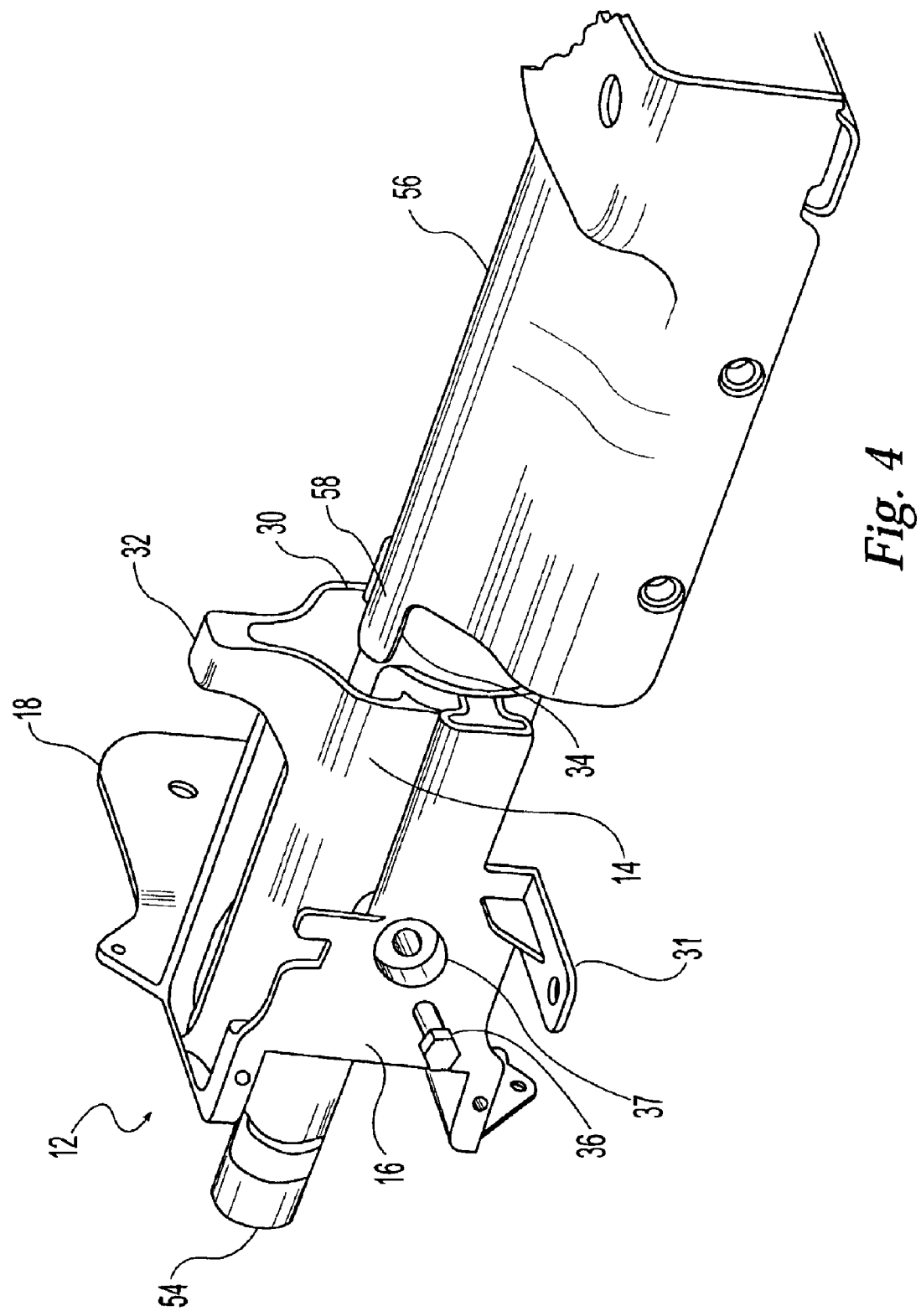
FIG. 4 is side perspective view of the bottom of the adapter/bracket mounting system of FIG. 3 showing in greater detail, both the tongue and notch components and the mounting bolt that secures the adapter to the steering column.

As shown in FIGS. 3 and 4, the inclusion of steering column interface 30 allows adapter 12 to be mounted on steering column support tube 52 in only one orientation. This one-way attachment feature prevents adapter 12 from being installed improperly either by the party assembling the vehicle or by another end-user of this invention. Steering column subassembly 50 includes steering column support tube 52, steering column shaft 54, bracket 56, tongue 58, and plate 60. Steering column interface 30 includes notch 34 which engages tongue 58 of bracket 56 when adapter 12 is mounted on steering column support tube 52. In an alternate embodiment, adapter 12 includes a tongue structure and bracket 56 includes a notch for engaging the tongue structure. Adapter 12 is secured to steering column support tube 52 by inserting mounting bolt 36 into cavity 37 (see FIG. 4). Mounting bolt 36 passes through an aperture in steering column support tube 52. Bracket 56 supports steering column support tube 52 and typically mounts to the underside of the vehicle's dashboard. Plate 60 typically attaches to the vehicle's firewall. When adapter 12 is properly installed, steering column shaft 54 protrudes through the end of adapter 12 opposite steering column interface 30. The vehicle's steering wheel is mounted to the end of steering column shaft 54 that protrudes from adapter 12.

Figure 6A:
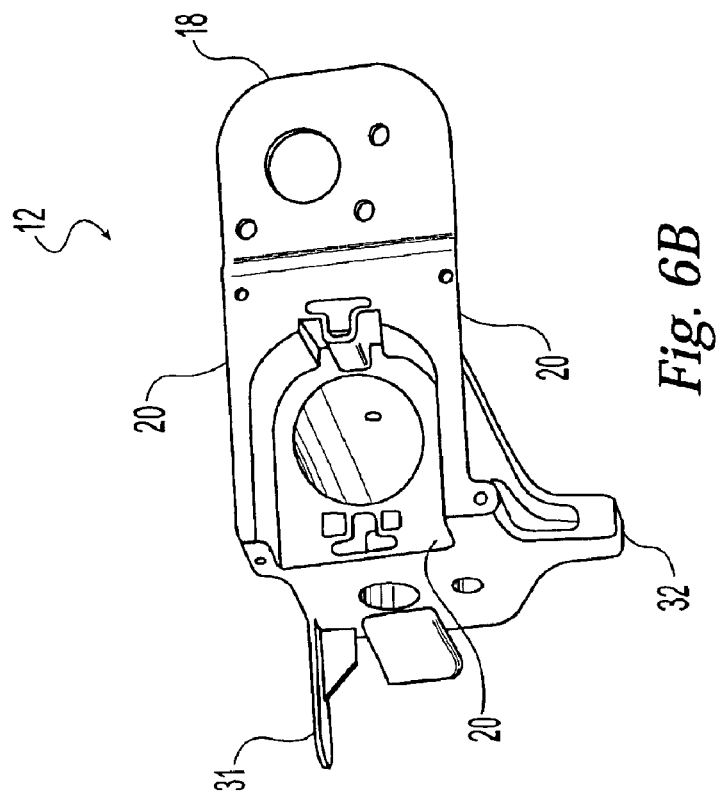
FIG. 6A is a front view of a preferred embodiment of the adapter component of the present invention.
Figure 6B:
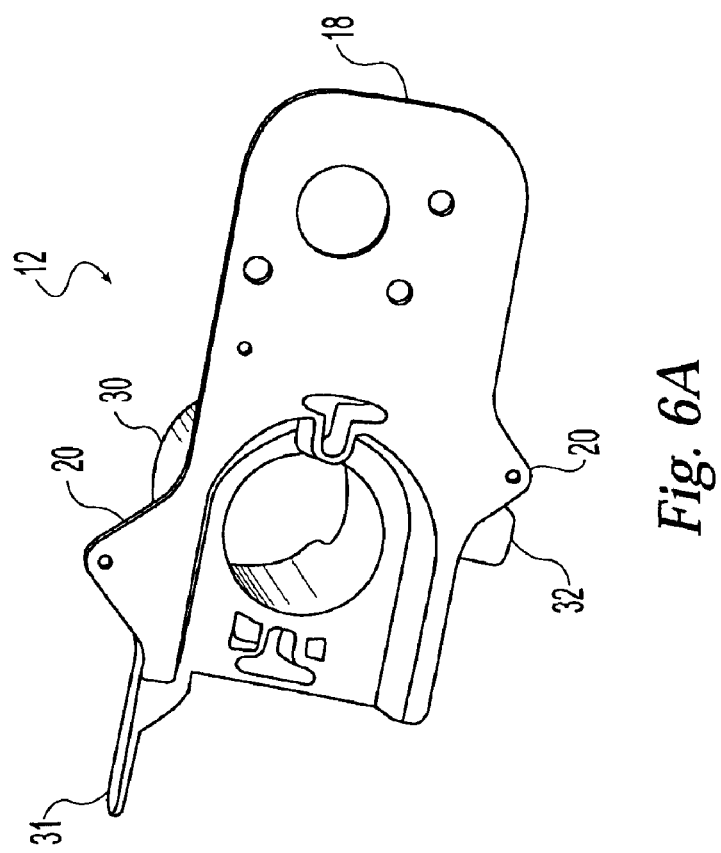
FIG. 6B is a perspective view of an embodiment of the adapter wherein the clockspring mounting surface has been modified to accommodate a different type of clockspring.
Figure 7A:
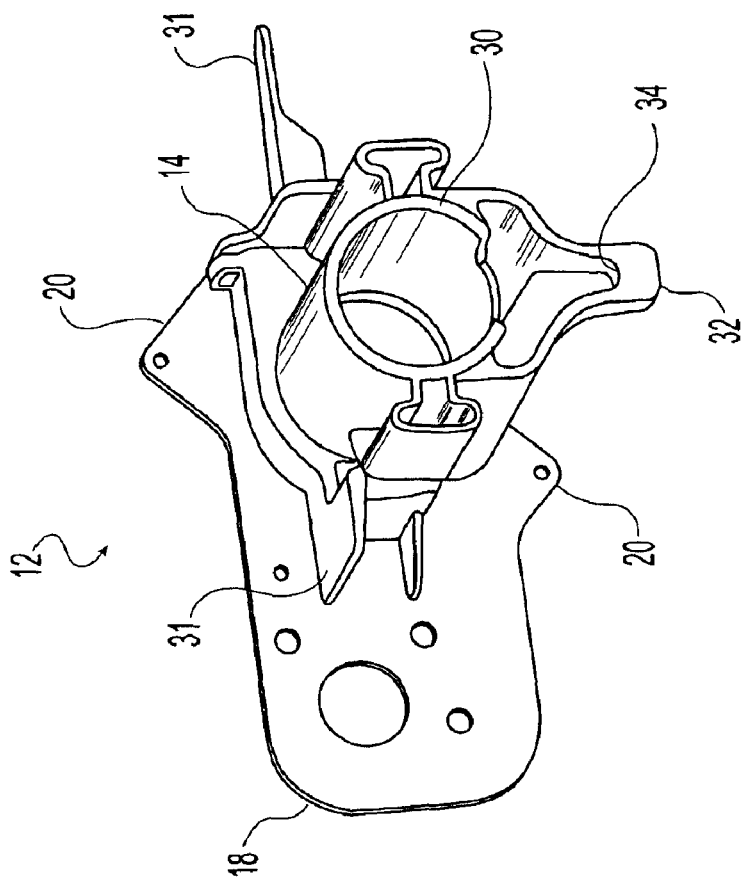
FIG. 7A is a front view of a preferred embodiment of the adapter component of the present invention.
Figure 7B:
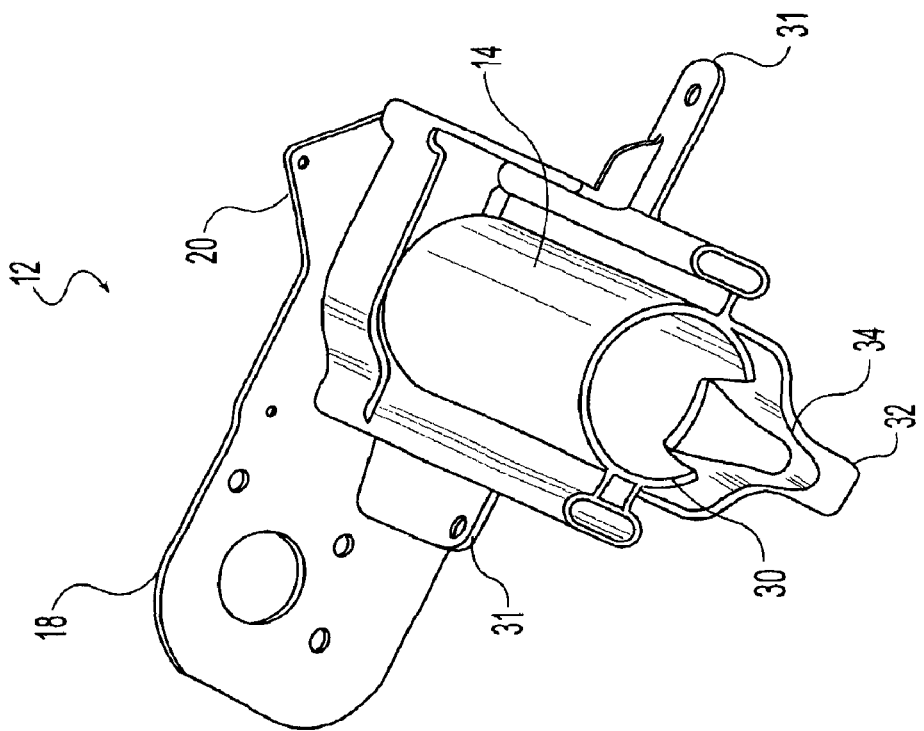
FIG. 7B is a perspective view of an embodiment of the adapter wherein the column cover mounting surface has been modified to accommodate different column covers.

Alternate embodiments of adapter 12 may be fabricated to accommodate different system devices, different mounting requirements, and different vehicle characteristics. For example, FIG. 5A depicts a preferred configuration for adapter 12, while FIG. 5B depicts an alternate embodiment of adapter 12 wherein hand brake valve mounting surface 18 has been removed. Likewise, FIG. 6A depicts a preferred configuration for adapter 12, while FIG. 6B depicts an alternate embodiment of adapter 12 wherein clockspring mounting surface 20 has been modified to accommodate a different type of clockspring. Similarly, FIG. 7A depicts a preferred configuration for adapter 12, while FIG. 7B depicts an alternate embodiment of adapter 12 wherein column cover mounting surface 31 has been modified to accept a different type of column cover.

Adapter 12 may be fabricated from a variety of materials including, preferably, polymers or plastics such as glass reinforced nylon or glass reinforced acetyl. Adapter 12 may also be fabricated from aluminum, an aluminum alloy, or from any other material that provides adequate rigidity and durability. In a preferred embodiment, adapter 12 is generally cylindrical in shape with an outside diameter of about 4 inches (10.16 cm), a length of about 5 inches (12.7 cm), and a thickness of about 0.100 inches (0.25 cm). Hand brake valve 18 mounting surface extends about 5 inches (12.7 cm) from the center of the cylindrical body of adapter 12 and is about 0.100 inches (0.25 cm) thick. The lateral column cover mounting surfaces each extend about 5 inches (12.7 cm) from the center of the cylindrical body and are also about 0.100 inches (0.25 cm) thick. The dimensions for the preferred embodiment of adapter 12 are merely exemplary; adapter 12 may be modified for use with other steering columns and system devices that require different dimensions and physical characteristics.

The present invention may be assembled and installed in the following preferred manner. Adapter 12 is mounted on steering column sub-assembly 50 and the various system devices are then mounted on adapter 12. The adapter and steering column subassembly are then installed in a vehicle. In an alternate method, steering column sub-assembly 50 is mounted in a vehicle such as a truck, van, bus, or automobile. Adapter 12 is mounted on steering column support tube 52 and the various system devices are then mounted on adapter 12. The column covers are then mounted on adapter 12 and steering column assembly is complete.

While the above description contains many specificities, these should not be construed as limitations on the scope of the invention, but rather as exemplification of preferred embodiments.

What is claimed:

1. A device for mounting items on a steering column, wherein said device further comprises:
   (a) a one-piece removable adapter further comprising a plurality of mounting surfaces for attaching said items directly to said removable adapter, and wherein the internal geometry of said removable adapter conforms to the share of said steering column; and
   (b) an attachment means for connecting said removable adapter directly to said steering column.

2. The device of claim 1, wherein said items are selected from the group consisting of a multifunction switch, a hand brake valve, a clockspring, a bottom column cover, and a top column cover.

3. The device of claim 1, wherein said adapter is generally cylindrical in shape.

4. A removable adapter for attaching a plurality of items to a steering column, comprising:
   (a) an external interface further comprising a plurality of surfaces for mounting items on said adapter; and
   (b) an internal interface conforming to the shape of said steering column for detachably mounting said adapter directly on said steering column, said internal interface further comprising a means for engaging said steering column in only one orientation, and wherein said means for engaging said steering column in only one orientation further comprises a notch formed in one end of said adapter.

5. The adapter of claim 4, wherein said plurality of items are selected from the group consisting of a multifunction switch, a hand brake valve, a clockspring, a bottom column cover, and a top column cover.

6. The adapter of claim 4, wherein said plurality of surfaces further comprises a multifunction switch mounting surface, a hand brake valve mounting surface, a clockspring mounting surface, and column cover mounting surface.

7. The adapter claim 4, wherein said adapter is fabricated from polymer, plastic, glass reinforced nylon, glass reinforced acetyl, aluminum, or an aluminum alloy.

8. The adapter of claim 4, wherein said adapter is generally cylindrical in shape with an outside diameter of about 4 inches ( 10.16 cm), a length of about 5 inches ( 12.7 cm), and a thickness of about 0.100 inches ( 0.25 cm).

9. A steering column assembly, comprising:
   (a) a steering column subassembly further comprising a steering column and a mounting bracket, said mounting bracket further comprising a tongue projecting from one end of said mounting bracket; and
   (b) a one-piece adapter detachably connected to said steering column, said adapter further comprising:
      (i) a plurality of surfaces for mounting a plurality of items to said adapter; and
      (ii) a notch in one end adapter to receive said tongue, and wherein the engagement of said notch by said tongue permits said adapter to be connected to said steering column in a single orientation, and wherein the engagement of said notch and said tongue prevents rotation of said adapter around said steering column.

10. The steering column assembly of claim 9, wherein said steering column further comprises a steering column shaft and a steering column support tube surrounding a portion of said steering column shaft.

11. The steering column assembly of claim 9, wherein said plurality of surfaces further comprises a multifunction switch mounting surface, a hand brake valve mounting surface, a clockspring mounting surface, and column cover mounting surface.

12. The steering column assembly of claim 9, wherein said plurality of items further comprises a multifunction switch, a hand brake valve, a clockspring, a bottom column cover, and a top column cover.

13. The steering column assembly of claim 9, wherein said adapter is fabricated from polymer, plastic, glass reinforced nylon, glass reinforced acetyl, aluminum, or an aluminum alloy.

14. The steering column assembly of claim 9, wherein said adapter is generally cylindrical in shape with an outside diameter of about 4 inches ( 10.16 cm), a length of about 5 inches ( 12.7 cm), and a thickness of about 0.100 inches ( 0.25 cm).

* * * * *